United States Patent [19]

Dahlman

[11] Patent Number: 4,827,662

[45] Date of Patent: May 9, 1989

[54] MOLE TRAP

[76] Inventor: Ervin H. Dahlman, R.R. 2, Box 464-B, Billings, Mo. 65610

[21] Appl. No.: 180,096

[22] Filed: Apr. 11, 1988

[51] Int. Cl.$^4$ ............................................. A01M 23/24
[52] U.S. Cl. ............................................ 43/87; 43/86
[58] Field of Search ................................ 43/80, 86, 87

[56] References Cited

U.S. PATENT DOCUMENTS

| | | | |
|---|---|---|---|
| 936,808 | 10/1909 | Pozsonyi | 43/86 |
| 1,049,406 | 1/1913 | Scheffer | 43/86 |
| 1,065,130 | 6/1913 | Hoover | 43/86 |
| 1,079,827 | 11/1913 | Beers | 43/86 |
| 1,315,510 | 9/1919 | Juricek | 43/86 |
| 2,348,002 | 5/1944 | Glass | 43/86 |
| 2,357,414 | 9/1944 | McJunkin | 43/86 |

Primary Examiner—Kurt Rowan
Attorney, Agent, or Firm—Kokjer, Kircher, Bradley, Wharton, Bowman & Johnson

[57] ABSTRACT

A mole trap has a frame that includes two spikes driven into the ground on opposite sides of an active mole run. A pair of wire loops are threaded through ground level eyes and are embedded in the ground to encircle the mole run. When a mole passes through the run, a triggering mechanism is tripped and a tension spring forcefully pulls the loops upwardly to capture the mole in one of the loops. In setting of the trap, the spring is placed under tension only after the other parts have been properly positioned. A special tool is used both to embed the wire loops and to place the spring under tension.

20 Claims, 1 Drawing Sheet

U.S. Patent
May 9, 1989
4,827,662
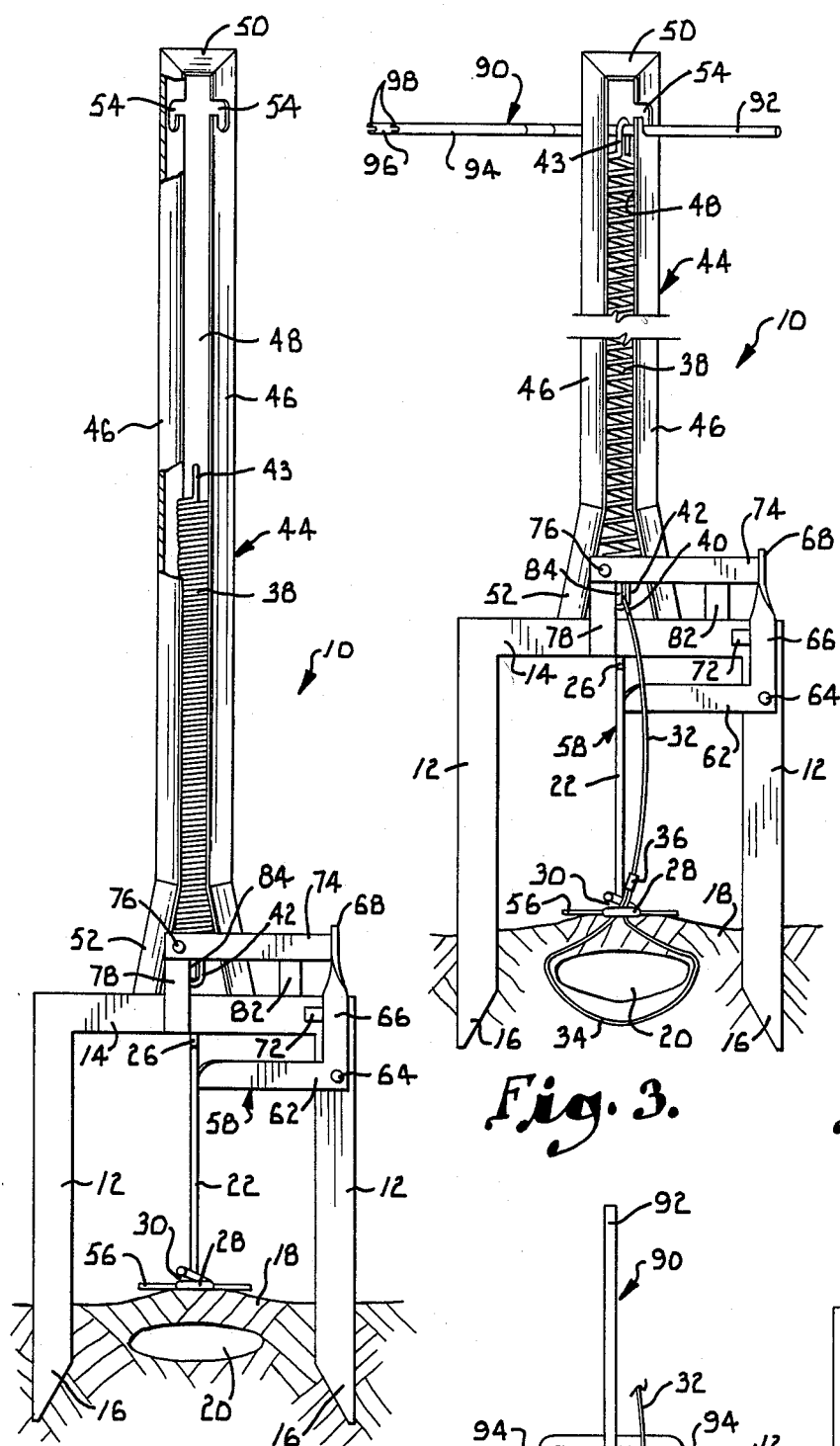
Fig. 1.
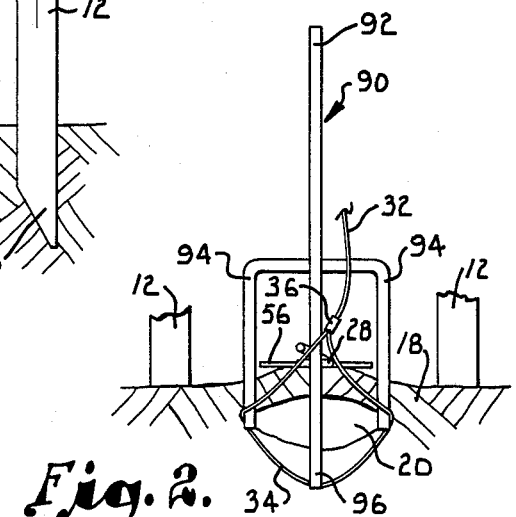
Fig. 2.
Fig. 3.
Fig. 4.
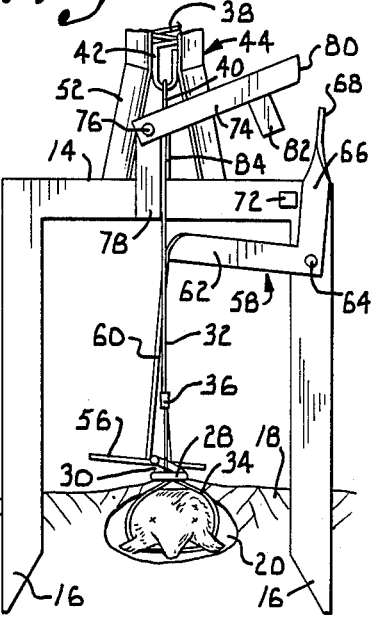
Fig. 5.

MOLE TRAP

BACKGROUND AND SUMMARY OF THE INVENTION

This invention relates to a trap which is used to capture moles and other burrowing animals.

Moles and other burrowing animals have long plagued yards, gardens, flower beds and other areas containing vegetation. Over the years, many different types of mechanical mole traps have been proposed, including the traps shown in U.S. Pat. No. 1,079,827 to Beers and U.S. Pat. No. 2,475,467 to Alvau. However, the traps that have been proposed in the past are effective only part of the time if at all.

Mole traps have typically included spring loaded spikes or bails which are intended to be triggered when a mole passes through a tunnel. The triggering mechanisms that have been proposed have been lacking in a number of respects. Those that include a part which projects into the mole tunnel tend to frighten the animals away before they have gotten close enough to activate the trigger. Some traps cause considerable damage to the surrounding vegetation, both when they are applied and when they are triggered. Other traps are unsuitable for use in both open yard areas and more confined areas such as small gardens or flower beds.

The mole traps that have been available in the past also suffer from lack of durability and a tendency to wear excessively after only a few uses. Safety has also been a problem. Most of the traps that have been available in the past are constructed in a manner to present a possibility of human injury during setting of the spring, and the injury potential is especially great with traps that employ sharp spikes for impaling the mole. It is also necessary for a proper balance to be achieved in the sensitivity of the triggering mechanism. The trap should not be triggered so easily that false triggering occurs but it should be reliably triggered whenever a mole is present in the tunnel to which the trap is applied. Prior traps have not been able to achieve and maintain a proper sensitivity balance.

The present invention is directed to an improved mole trap that is simple and effective and is not plagued by the problems that have hampered other traps.

More specifically, it is the principal object of the invention to provide a mole trap that functions in a dependable and repeatable manner to capture moles and other burrowing animals. The mole trap has a unique triggering mechanism and wire loop arrangement that function more effectively to capture moles than the traps that have been proposed in the past.

Another object of the invention is to provide a mole trap having a triggering mechanism that is subject to neither premature triggering nor failure to trigger when it should.

A further object of the invention is to provide a mole trap that can be safely set without the possibility of human injury. In this respect, it is an especially important feature of the invention that the spring is placed under tension from above and only after the remaining components have already been placed in their set positions.

A still further object of the invention is to provide a mole trap of the character described which is constructed simply and economically and which can be operated repeatedly without undue wear on the parts.

An additional object of the invention is to provide a mole trap of the character described that makes use of wire loops for capturing moles. The use of wire loops instead of sharp spikes enhances the safety of the device and allows it to function effectively to capture moles without the possibility of sharp spikes being driven into the hands during setting of the trap.

Yet another object of the invention is to provide a mole trap of the character described which is suitable for use both in confined areas and in open areas, which does not unduly damage the surrounding vegetation, and which is able to reliably capture moles moving in either direction in a mole run.

Still another object of the invention is to provide, in a mole trap of the character described, a multiple purpose tool which serves both to place the spring under tension during setting of the trap and as an aid in the proper positioning of the wire loops that are used for the capture of moles.

Other and further objects of the invention, together with the features of novelty appurtenant thereto, will appear in the course of the following description.

DESCRIPTION OF THE DRAWING

In the accompanying drawing which forms a part of the specification and is to be read in conjunction therewith and in which like reference numerals are used to indicate like parts in the various views:

FIG. 1 is a side elevational view of a mole trap constructed according to a preferred embodiment of the present invention, with the spring in its relaxed condition and portions broken away for purposes of illustration;

FIG. 2 is a fragmentary elevational view showing the manner in which the loop positioning tool can be used to properly position one of the wire loops around a mole tunnel;

FIG. 3 is a side elevational view similar to FIG. 1 but showing the spring held under tension in the set position of the trap, with the break lines indicating continuous length;

FIG. 4 is an end elevational view taken from the right end of FIG. 3, with portions broken away for purposes of illustration and the break lines indicating continuous length; and FIG. 5 is a fragmentary front elevational view on an enlarged scale showing the mole trap triggered to capture a mole in the mole tunnel.

DETAILED DESCRIPTION OF THE INVENTION

Referring now to the drawing in more detail, numeral 10 generally designates a mole trap constructed in accordance with the present invention. The mole trap 10 has on its base portion a rigid frame formed by a pair of parallel spikes 12 and a horizontal cross bar 14 which extends between and interconnects the spikes 12 at their upper ends. Each spike 12 has a pointed tip 16 on its lower end. The spikes 12 are spaced apart far enough to allow the pointed end 16 to be driven into the ground 18 on opposite sides of a subterranean mole tunnel such as that identified by numeral 20. Driving of the spikes into the ground mounts the frame of the mole trap 10 in the proper position with respect to the mole tunnel 20.

A pair of legs 22 form the opposite sides of a wicket which may be constructed from stiff wire. The legs 22 are connected at their top ends by a cross piece 24 (see FIG. 4 in particular). The cross piece 24 is welded to an L-shaped bracket 26 which is in turn welded or otherwise secured to the cross bar 14 near its center. The legs 22 extend downwardly and outwardly somewhat toward the ground, and each leg 22 carries on its lower end an eye 28. The eyes 28 occupy a common horizontal plane and lie on top of the ground 18 above the mole tunnel 20 when the frame of the mole trap is applied to the ground in the manner shown in the drawing. The eyes 28 are spaced apart from one another on opposite sides of the frame of the mole trap. Each eye 28 is formed by a double coil of the wire on the lower end of the corresponding leg 22. A small gap 30 is formed in the side of each eye between the two coils of which the eye is formed.

The mole trap 10 includes an elongate flexible wire 32 which may be a braided wire commonly referred to as "wire rope". On its opposite ends, the wire 32 is formed into nooses or loops 34 which are somewhat larger in circumference than the mole run 20. Each loop 34 is secured by a ferrule 36 which is crimped onto the end of the wire and a part of the wire spaced from the nnd far enough to provide the loop 34 with the desired size.

An intermediate portion of wire 32 is suitably secured to the lower end of a large tension spring 38. The wire 32 may be tied or looped at 40 to a ring 42 located on the bottom end of the spring 38. The loop 40 is located midway along the length of wire 32 and may be secured by a ferrule or similar fastening device (not shown). The top end of spring 38 is also provided with a ring or hook 43.

The tension spring 38 is contained by a spring tower 44 which is mounted on and extends upwardly from the crossbar 14 of the frame. The tower 44 has on its opposite sides a pair of opposed metal angles 46. The free edges of the flanges of the opposing angles 46 are spaced apart to provide a continuous slot 48 through the spring tower 44 extending vertically along its entire length. The angles 46 are connected at their top ends by a short cross member 50. At its lower end, the spring tower 44 includes short inclined angle members 52 which diverge from top to bottom to provide the slot 48 with greater width at the bottom. Two of the opposite flanges of angles 46 are provided with L-shaped slots 54 at a location shortly below the upper cross member 50. Each slot 54 extends into the free edge of the flange and then downwardly. The two slots 54 oppose one another.

The mole trap 10 has a special triggering mechanism which includes a horizontal foot 56 that may be applied to the surface of the ground 18 immediately above the mole tunnel 20. The foot 56 is carried on the lower end of a Z-shaped pivot lever 58. The lever 58 has a lower vertical leg 60 which carries the foot 56 on its bottom end. A generally horizontal bar 62 extends from the top end of leg 60. The opposite end of bar 62 is pivoted at 64 to one of the spikes 12 near its top end. An upper vertical leg 66 extends upwardly from the pivot pin 64. Preferably, bar 58 is formed in a single piece of flat bar which is bent through a 90° angle at the intersection between leg 60 and bar 62. The top end of leg 66 is likewise bent through a 90° angle to provide a flat tongue 68 which is located in a plane oriented parallel to the plane of leg 60. As best shown in FIG. 4, the tongue 68 is provided with a slot 70.

The pivot lever 58 can be pivoted about pin 64 between the set position shown in FIGS. 1 and 3-4 and the release position shown in FIG. 5. The lever is pivoted from the set position to the release position by a mole passing through the mole tunnel 20 beneath the foot 56. The mole pushes the soil above the mole tunnel upwardly, and this in turn displaces the foot 56 and pivots lever 58 to its release position. A stop 72 engages leg 66 of the lever to prevent it from pivoting beyond the set position. Pivoting of the lever in the opposite direction is limited by engagement of the end of bar 62 with the cross bar 14.

The triggering mechanism further includes a pivot arm 74. One end of arm 74 is pivoted at 76 to the top end of a mounting bar 78 welded or otherwise secured to the crossbar 14. The end of arm 74 opposite the pivot pin 76 is beveled and slightly rounded as indicated at 80, and this end of the arm is inserted into the slot 70 when the pivot arm is cocked. In the cocked position, pivot arm 74 extends horizontally and has a stop 82 on its underside engaged against the crossbar 14. The pivot arm 74 is held in its cocked position by the fit of its end 80 in the slot 70. However, when lever 58 is pivoted to its release position, end 80 is released from the slot 70 and arm 74 can pivot upwardly about pin 76 to the release position shown in FIG. 5.

With particular reference to FIG. 4, a short pivot bar 84 has a free end which is held beneath arm 74 when the pivot arm is in its cocked position. The opposite end of bar 84 is pivoted at 86 to the top end of a mounting plate 88 secured to one side of the cross bar 14. The pivot bar 84 extends through the ring 42 on the bottom end of the tension spring 38.

So long as the pivot arm 74 is held in its cocked position by lever 58, bar 84 is retained beneath arm 74 and cannot pivot upwardly about the pivot pin 86. Thus, the lower end of spring 38 cannot move upwardly. However, when lever 58 is pivoted to release arm 74, bar 84 is likewise released, and the bottom end of spring 38 can snap upwardly to in turn pull wire 32 upwardly for the capture of a mole in one of the loops 34.

Numeral 90 generally designates a tool which performs multiple functions in connection with the mole trap. The tool 90 includes a handle 92 having on one end two outside prongs 94 and a center prong 96 which is somewhat longer than the other prongs 94. As best shown in FIG. 3, the free end of each prong 94 and 96 is provided with a notch 98 having a size to closely receive the wire 32.

In use, the mole trap 10 is initially applied to the ground by driving the spikes 12 into the ground on opposite sides of an active mole tunnel such as the tunnel 20. The soil above the mole tunnel should be packed down somewhat so that a mole passing through the tunnel will press the soil upwardly against the foot 56 of the trigger mechanism. The foot 56 rests on the ground immediately above the mole tunnel. The two eyes 28 are spaced apart on opposite sides of the foot 56, as best shown in FIG. 4.

With the spring 38 in the relaxed position shown in FIG. 1, the tool 92 is preferably used to embed the two loops 34 in the ground at locations immediately below the respective eyes 28. The handle end of tool 90 may be used to loosen the soil on opposite sides of and immediately beneath the mole run in order to facilitate embedding of the wire loops 34 in the ground. It may also be necessary to remove rocks and other debris that are encountered. The manner in which the tool is used to embed each loop 34 is best shown in FIG. 2, and it is noted that the loop 34 is positioned to extend through each of the notches 98 in the bottom ends of the prongs 94 and 96. The prongs can then be pushed downwardly into the ground, with the two outside prongs 94 located generally on opposite sides of the mole run 20 and the center prong 96 extending through the center of the mole run. The notches 98 maintain th wire loop 34 properly positioned on the prongs. Each loop 34 is thereby positioned to encircle the mole run, and the two loops are spaced apart approximately the same distance as the distance between the two eyes 28.

Once both loops 34 have been properly positioned in the ground, the wire 32 is threaded through both of the eyes 28. Because of the presence of the gaps 30 in the sides of the eyes, threading of the wire into the eyes can take place after the loops 34 have been properly positioned around the mole run. This assures that the wire will have sufficient slack to facilitate proper positioning of the loops in the ground.

Lever 58 is placed in the set position with foot 56 on the surface of the ground above the mole run, end 80 of arm 74 is inserted into the slot 70, and bar 84 is positioned beneath arm 74 in the position shown in FIG. 4.

Bar 84 is extended through the bottom ring 42 of spring 38 and is placed beneath arm 74. End 80 of arm 74 is then inserted into slot 20 with lever 58 placed in its set position wherein foot 56 is located on the surface of the ground above the mole run. All of the parts can be positioned in the foregoing manner while the spring 38 remains in a relaxed condition. Consequently, there is no possibility that the spring can cause inadvertent triggering of the trigger mechanism and possible injury to the person attempting to set the trap.

It is only after the parts have been properly positioned that the spring 38 is placed in the tense condition. This is accomplished by inserting the handle 92 of tool 90 through slot 48 and through the ring or hook 43 on the top end of spring 38. The handle 92 is pulled upwardly in the slot 48 until it reaches the two L-shaped slots 54, at which time the handle is turned to one side such that it enters the slots 54 and drops into their base portions. The tool 90 can then be released and the handle 92 is thereafter securely held in the base portions of the slots 54 to maintain spring 38 under tension.

When a mole passes through the tunnel 20, it disturbs the soil beneath foot 56 and thereby displaces the foot and pivots lever 58 to its release position. Arm 74 is in turn released, and bar 84 can no longer hold the lower end of spring 38. Consequently, the bottom end of the spring snaps upwardly in a forceful manner under the influence of the spring tension, and this pulls wire 32 and both loops 34 upwardly in a forceful manner. One of the loops 34 will at this point be looped around the body of the mole due to the location of the loops relative to the foot 56. When wire 32 is pulled upwardly, the loop 34 is drawn around the mole and is pulled partially through the eye 28, thus capturing the mole in the loop and destroying him due to the force which is applied to the loop that encircles the mole body. It is noted that passage of part of the loop through eye 28 reduces the circumference of the loop and draws it tightly around the mole caught in the trap.

The mole can be disposed of without the need to handle it. After the frame has been withdrawn from the ground, handle 92 of tool 90 can be removed from the slots 54 and moved downwardly in slot 48 to relax the spring tension. Then, the prong end of the tool can be used to loosen the loop 54 which is tightened around the mole, and the mole can be displaced from the loop through use of the prong end of the tool.

In this manner, the mole trap 10 functions effectively to capture moles that pass through the mole run 20 to which the trap is applied. The spikes 12 subject the ground 18 to only minimal damage. It is noted that the provision of two spaced apart loops 34 on opposite sides of the foot 56 assure that one of the loops 34 will capture the mole regardless of which direction it travels through the mole run. The use of a single wire 32 which is tied around ring 42 at a single place is advantageous both in simplifying the mole trap construction and in leaving as much room as possible available in the ring 42 for extension of bar 84. The wide bottom end of the spring tower that is provided by the inclined angles 52 facilitates insertion and removal of the spring 38 and provides adequate room for insertion of bar 84 through ring 42.

It is again pointed out that setting of the mole trap can be carried out in an entirely safe manner since the activating spring 38 is placed under tension from above and well away from the triggering mechanism. Even then, the spring is tensioned only after all of the other parts have been set in their triggering positions. The construction and arrangement of the triggering mechanism is such that premature triggering does not take place. However, the device triggers reliably because the trigger is activated whenever a mole passes beneath the foot 56.

From the foregoing, it will be seen that this invention is one well adapted to attain all the ends ahd objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A mole trap comprising:
   a frame applicable to the ground above a mole tunnel;
   first and second rigid legs on said frame each having an eye thereon located adjacent the ground above the tunnel when the frame is applied to the ground;
   a flexible wire threadable through said eyes and having first and second legs thereon sized to be placed in the ground to encircle the tunnel at locations below first and second eyes, respectively;
   a spring having a tense condition and being releaseable from the tense condition to assume a relaxed condition;
   means for coupling said wire with said spring in a manner to forcefully pull said first and second loops toward said respective first and second eyes to capture a mole in the loops when said spring is released from the tense condition; and
   trigger means for effecting release of said spring from the tense condition when a mole passes through the tunnel within the loop.

2. The mole trap of claim 1, wherein said frame includes:
   a pair of spikes for penetration of the ground on opposite sides of the mole tunnel; and a cross bar extending between and interconnecting the spikes, said cross bar being elevated above the ground when the spikes are applied to the ground.

3. The mole trap of claim 2, wherein said first and second legs extend generally downwardly from said cross bar.

4. The mole trap of claim 1, wherein:
said trigger means comprises a foot applicable to the ground above the tunnel when the spikes are applied to the ground; and
said eyes are spaced apart on opposite sides of said foot.

5. The mole trap of claim 4, wherein said trigger means comprises:
a trip lever pivoted to said frame and having a top end presenting an opening and a bottom end carrying said foot thereon, said foot being displaced by a mole passing through the tunnel thereunder and acting when displaced to pivot said lever from a set position to a release position;
a pivot arm pivoted to the frame and having an end held in said opening in the lever when the lever is in the set position and said end of the arm is applied to said opening in a cocked position of the arm, said arm being pivoted away from said cocked position when said lever is tripped to the release position thereof; and
a pivot bar pivoted to the frame and having an end held by said pivot arm in the cocked position thereof to retain the bar against upward pivotal movement, said bar holding the lower end of said spring to maintain the spring in its tense condition and being released from said arm when the lever is tripped to its release position to permit the spring to snap to the relaxed condition.

6. The mole trap of claim 5, including:
a spring tower on said frame extending upwardly therefrom and receiving said spring;
a spring tension bar applicable to the spring to effect the tense condition thereof; and
means on said spring tower for receiving and holding said tension bar to maintain the spring in the tense condition until said pivot bar and the lower end of the spring are relaxed.

7. The mole trap of claim 6, wherein said spring tension bar has an end presenting a plurality of prongs applicable to said loops to embed the loops in the ground at locations encircling the tunnel.

8. The mole trap of claim 1, wherein said eye and loop arranged to effect drawing of the loop partially through the eye when said spring is released from the tense condition, whereby the circumference of the loop is reduced and the loop is tightened around the mole.

9. A mole trap comprising:
a frame applicable to the ground above a mole tunnel;
a rigid leg on said frame having an eye thereon located adjacent the ground above the tunnel when the frame is applied to the ground;
a flexible wire threadable through said eye and having a loop thereon sized to be placed in the ground to encircle the tunnel;
a spring having a tense condition and being releaseable from the tense condition to assume a relaxed condition;
means for coupling said wire with said spring in a manner to forcefully pull said loop toward said eye to capture a mole in the loop when said spring is released from the tense condition;
trigger means for effecting release of said spring from the tense condition when a mole passes through the tunnel within said loop; and
a tool comprising a handle and a plurality of prongs extending from said handle, said prongs being applicable to said loop to embed the loop in the ground at a location encircling the tunnel below said eye.

10. The mole trap of claim 9, including a notch on each prong for receiving the loop of said wire.

11. The mole trap of claim 9, wherein said handle is constructed for application to said spring to effect and maintain the tense condition thereof.

12. A mole trap comprising:
a frame applicable to the ground above a mole tunnel;
a rigid leg on said frame having an eye thereon located adjacent the ground above the tunnel when the frame is applied to the ground;
a flexible wire threadable through said eye and having a loop threreon sized to be placed in the ground to encircle the tunnel;
a spring having a tense condition and being releaseable from the tense condition to assume a relaxed condition;
means for coupling said wire with said spring in a manner to forcefully pull said loop toward said eye to capture a mole in the loop when said spring is released from the tense condition; and
trigger means for effecting release of said spring from the tense condition when a mole passes through the tunnel within said loop, said eye and loop being arranged to effect drawing of the loop partially through the eye when said spring is released from the tense condition, whereby the circumference of the loop is reduce and the loop is tightened around the mole.

13. The mole trap of claim 12, including a gap in the side of said eye to permit entry of the wire into the eye through said gap.

14. A mole trap comprising:
a frame applicable to the ground above a mole tunnel, said frame including a pair of spaced apart spikes for penetrating the ground on opposite sides of the tunnel and a cross bar interconnecting the spikes;
a pair of rigid legs extending from said cross bar and each carrying an eye, said eyes being spaced apart and each being located adjacent the ground above the mole tunnel when said frame is applied to the ground;
a wire threaded through both eyes and having opposite ends formed as loops which may be embedded in the ground beneath the respective eyes to encircle the mole tunnel, said wire having an intermediate portion between said loops;
a spring support tower on said frame;
a tension spring on said tower having a top end and a bottom end adjacent said cross bar, said spring having a tense condition and a relaxed condition;
means for coupling said intermediate portion of the wire with said bottom end of the spring in a manner to effect, in response to release of the spring from the tense condition thereof, forceful pulling of both loops toward and partially through the respective eyes to capture a mole in one of the loops; and
a trigger mechanism operable to release said spring from the tense condition thereof when a mole passes through the tunnel between said spikes.

15. The mole trap of claim 14, including a gap in the side of each eye permitting the wire to enter each eye through the gap therein.

16. The mole trap of claim 14, including:
 - a spring tension bar applicable to said top end of the spring;
 - a slot through said spring tower extending generally vertically to permit extension of said tension bar therethrough and raising of the bar to effect tensioning of the spring to its tense condition; and
 - means on said spring tower for receiving and retaining said tension bar to maintain the spring in the tense condition.

17. The mole trap of claim 16, including one end of said tension bar carrying a plurality of prongs applicable to said loops in a manner to embed the loops in the ground at locations encircling the mole tunnel beneath the respective eyes.

18. The mole trap of claim 16, including a free end of each prong and a notch in the free end of each prong, said notches each having a size to closely receive the loops therein to assist in embedding the loops in the ground.

19. A mole trap comprising:
 - a frame applicable to the ground above a mole tunnel;
 - a spring support tower extending upwardly from said frame;
 - a tension spring on said tower having upper and lower ends and tense and relaxed conditions;
 - a trip lever pivoted to said frame and having top and bottom ends, said top end presenting an opening and said bottom end carrying a foot which is displaced to pivot said lever from a set position to a release position when a mole passes through the tunnel beneath said foot;
 - a pivot arm pivoted to the frame and having an end held in said opening in the lever when the lever is in the set position and said end of the arm is applied to said opening in a cocked position of the arm, said arm being pivoted away from said cocked position when said lever is tripped to the release position thereof;
 - a pivot bar pivoted to the frame and having an end held by said pivot arm, in the cocked position thereof to retain the bar against upward pivotal movement, said bar holding the lower end of said spring to maintain the spring in its tense condition and being released from said arm when the lever is tripped to its release position to permit the spring to snap to the relaxed condition; and
 - means for capturing a mole in the tunnel when the spring snaps to the relaxed condition.

20. The mole trap of claim 19, wherein:
 - said trip lever has a Z-shaped configuration presenting a first leg terminating in said bottom en and a second leg terminating in said top end; and
 - said trip lever is pivoted to said frame at a location adjacent an end of said second leg opposite said top end.

* * * * *